March 10, 1970  T. B. BISSETT ET AL  3,500,342
ELECTROLYTIC CELL COUNTER
Filed June 19, 1967
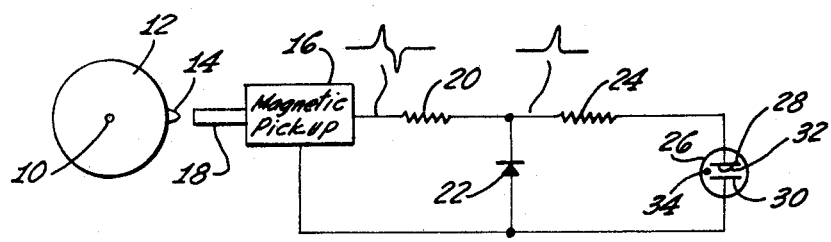
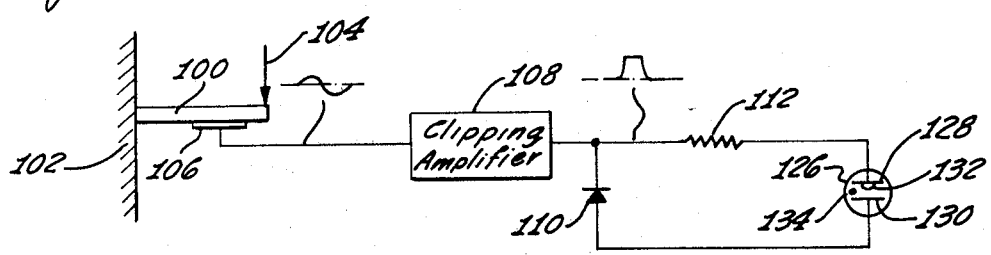
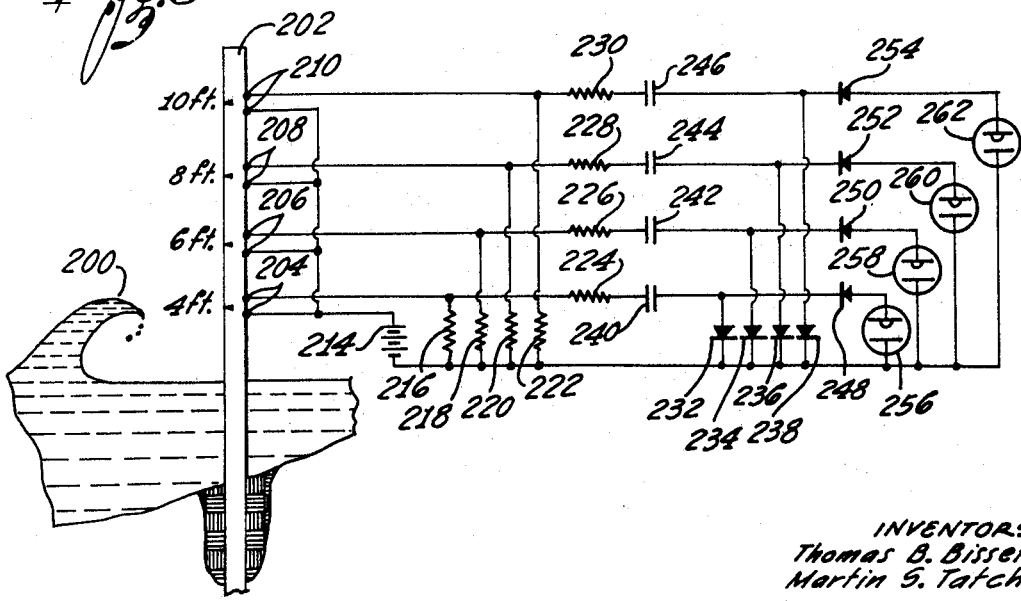
INVENTORS:
Thomas B. Bissett
Martin S. Tatch
ATTORNEYS United States Patent Office 3,500,342
Patented Mar. 10, 1970

3,500,342
ELECTROLYTIC CELL COUNTER
Thomas B. Bissett, Malibu, and Martin S. Tatch, West Los Angeles, Calif., assignors to The Bissett-Berman Corporation, Santa Monica, Calif., a corporation of California
Filed June 19, 1967, Ser. No. 646,912
Int. Cl. G11b 31/00
U.S. Cl. 340—173                                   15 Claims

ABSTRACT OF THE DISCLOSURE

This invention relates to an electrolytic cell counter using an electrolytic cell having at least two electrodes in contact with an electrolyte. A first one of the electrodes includes at least a layer of active material and the second one of the electrodes includes at least a layer of inert material and wherein the inert material is to be plated with the active material from the first electrode through the use of the electrolyte. The plating of the active material is in representation of the count. The invention includes means for producing an output signal in accordance with the occurrence of a particular event and wherein the value of the output signal is independent of the level of the particular event and wherein the output signal is applied to the electrolytic cell to plate discrete quantities of active material on the second electrode. The invention also includes the use of a plurality of such electrolytic cell counters, each responsive to a different level of the particular event so as to provide for a representation of the pattern of the levels of the particular event.

---

It is often desirable to provide for a counter to count the occurrences of a particular event. Normally, the counters used are mechanical counters which are actuated to count upon the occurrence of the particular event. If the particular event is a mechanical occurrence, such as the rotation of a shaft, it is relatively simple to connect a mechanical counter to the shaft to count the rotations. The mechanical counters do become relatively expensive and bulky when it is desirable to count a large number of occurrences of the particular event. It is, therefore, desirable to provide a counter which will count large quantities but which is relatively inexpensive in cost.

It is difficult to use a mechanical counter when the particular event to be counted is an event such as the flexing of a beam or a wave hitting a member such as a dock piling. It is obvious that some intermediary structure must be used, first to sense the occurrence of the event and then to produce a signal which is in turn used to drive the mechanical counter. This again is relatively expensive and, coupled with the cost of the mechanical counter, makes it undesirable to use such a mechanical system. It is, therefore, desirable to provide a counter which is more versatile than the mechanical counter and which may be more easily connected to count the particular event.

The present invention is directed to a counter which uses an electrolytic cell storage member to store the count information. The electrolytic cell storage member may be of the type shown in copending application Ser. No. 519,634, filed on Jan. 10, 1966, now Patent No. 3,423,648, in the name of Martin Mintz and assigned to the same assignee as the instant application. The electrolytic cell shown in the copending application includes an outer housing used as an outer electrode and constructed of an active material such as silver, and includes an inner electrode having at least a layer of an inert material such as gold. The outer and inner electrodes are both in contact with an electrolyte which is contained within the outer housing of the electrolytic cell. The electrolyte may be the type disclosed in copending application Ser. No. 554,003, filed on May 31, 1966, now Patent No. 3,423,643, in the name of Edmund A. Miller and assigned to the same assignee as the instant application.

When a current signal in representation of a particular information signal is applied in the proper direction between the electrodes of the electrolytic cell shown in the copending application, active material is plated onto the inner electrode from the outer electrode and the quantity of active material is in accordance with the quantity of the current signal. The quantity of the applied current signal is in turn in accordance with both the level of the information signal and the duration of the information signal. The quantity of the current signal may also be referred to as a charge since it is a current-time produce.

The present invention contemplates the use of an electrolytic cell storage unit such as the electrolytic cell shown in the copending application Ser. No. 519,634 in combination with a sensing device so as to use the electrolytic cell storage unit as part of a counter. The present invention includes means for sensing the occurrence of a particular event and for producing an output signal in accordance with the occurrence of the particular event. The value of the output signal is independent of the level of the particular event. The output signal is then applied to the electrolytic cell so as to produce a current flow in the electrolytic cell to provide for a transfer of a particular discrete amount of active material from the outer electrode to the inner electrode. The transfer of the particular discrete amount of active material provides for a discrete plating of the inner electrode in accordance with each occurrence of the particular event.

In order to determine the number of times the particular event has occurred, the electrolytic cell is read out by passing a current in a direction opposite to the plating current so as to transfer the plated material from the inner electrode back to the outer electrode. The readout current and the length of time necessary to provide for a complete replating of the active material are both monitored. The current-time product provides for a measurement of the quantity of active material which was originally deposited. The quantity of active material, of course, is in representation of the number of times the particular event has occurred.

In the particular embodiments of the invention as shown in this application, the electrolytic cell counter is shown counting various types of events. For example, a first embodiment of the invention illustrates the counting of the number of revolutions of a shaft. It is to be appreciated that this first embodiment is generalized so that the rotations of the shaft may represent any regularly occurring mechanical function.

A second embodiment of the invention illustrates the use of the electrolytic cell counter to monitor the number of times a beam is flexed. It is to be appreciated that this type of counting may be used in various types of stress analyses so as to provide information as to the number of times a member undergoes particular stresses. Also, the second embodiment is illustrative of various types of monitoring with which the present invention may be used.

A third embodiment of the invention disclosed in this application illustrates the electrolytic cell counter providing for the measurement of the occurrence of a wave of a particular height. For example, various dock pilings and other members which are placed in water are subjected to waves of various heights. The third embodiment illustrates the use of a plurality of electrolytic cell counters so as to measure the occurrence of waves of different heights. This information may be used to obtain a pattern of the waves which occur in a particular area. The wave pattern may be helpful in the design of bridges and dock pilings and other members which must sit in the water and be subjected to the waves. It is to be appreciated that this third embodiment is merely illustrative of similar plural counters which may be used to provide for the measurement of the pattern of other events. For example, the plurality of counters may be used to provide for a measurement of the pattern of wind, temperature, pressure, etc., in a particular area.

A clearer understanding of the invention will be had with reference to the particular embodiments which are described in the specification and are illustrated in the following figures wherein:

FIGURE 1 illustrates a first embodiment of an electrolytic cell counter of the present invention using a magnetic pickup member to count the rotations of a shaft;

FIGURE 2 illustrates a second embodiment of an electrolytic cell counter using a strain gauge pickup member to count the flexing of a member; and FIGURE 3 is a third embodiment of a plural electrolytic cell counter using multiple switch pickup members which measure the various heights of waves to count and store information relating to the wave pattern.

In FIGURE 1 a system is shown for counting the number of rotations of a shaft 10. The shaft 10 may include a flywheel 12 or other disc-like member. It is to be appreciated that the shaft 10 represents many devices which have a regular mechanical motion and that the counter of FIGURE 1 may be used to count the occurrence of the mechanical motion. The flywheel 12 may include a magnetic member 14. The magnetic member 14 is disposed at a position along the outer periphery of the flywheel 12 and the magnetic member 14 may be composed of a permanent magnetic material. A magnetic pickup unit 16 including a pickup member 18 is located adjacent to the flywheel 12. The pickup member 18 may be a coil of wire.

Every time the shaft 10 makes a complete rotation, the magnetic member 14 passes by the pickup coil 18 and induces a current flow in the pickup coil 18. The current in the pickup coil 18 is amplified by the magnetic pickup unit 16 to produce an output signal at the output of the magnetic pickup unit 16 as shown in FIGURE 1. It can be seen in FIGURE 1 that the output signal from the magnetic pickup unit 16 for each rotation of the flywheel shaft 10 may consist of a pair of opposite polarity pulses. These pulses which constitute the output signal contain portions where there are rapid changes between the positive and the negative directions.

It is desirable to produce a single polarity pulse output signal from the magnetic pickup unit 16 since the effects of the opposite polarity pulses would cancel each other. The output signal is passed through a circuit including a first series resistor 20, a parallel diode member 22 and a second series resistor 24 to produce a current signal. The diode 22 acts as a rectifier so as to eliminate the negative pulse portion of the output signal from the magnetic pickup unit 16 so that only the positive pulse portion of the output pulse signal is passed as shown in FIGURE 1 at the connection between the resistors 20 and 24. The positive pulse current signal is then applied to an electrolytic cell 26. The electrolytic cell 26 includes a pair of electrodes 28 and 30. The electrode 28 includes active material 32. The electrode 30 includes at least a coating of an inert material such as gold. The active material 32 may be a material such as silver. The electrolytic cell 28 also includes an electrolyte 34 within the electrolytic cell 26 so that the electrolyte is in contact with both the first and second electrodes.

Upon the passage of current through the electrolytic cell in the proper direction, the active material 32 is transferred through the electrolyte 34 to be plated on the electrode 30 containing the inert layer such as gold. The positive pulse current signal supplied to the electrolytic cell 26, therefore, provides for a transfer of a discrete quantity of active material from the electrode 28 to the electrode 30. This discrete quantity of active material is independent of the level of the particular event, which in the case of FIGURE 1 is the rotation of the shaft 10. For example, it does not matter whether the shaft is exerting more or less torque. The magnetic member 16 passes by the pickup member at a constant speed at all times. The output pulse from the magnetic pickup unit 16 always has the same magnitude, irrespective of the torque or other factors, except the speed of rotation of the shaft 10. The system of FIGURE 1, therefore, represents those systems which include a regularly occurring mechanical event.

The electrolytic cell counter of FIGURE 1, therefore, provides for a permanent storage of material in representation of the occurrence of a particular event. This information may be read back at a later time by the passage of current through the electrolytic cell 26 in the opposite direction so as to replace the active material transferred to the electrode 30 back to the electrode 28. As indicated above, the electrolytic cell 26 may be of the type shown in copending application Ser. No. 519,634, filed Jan. 10, 1966, in the name of Martin Mintz. In the copending application the electrolytic cell uses an outer cup-shaped housing as the first electrode. This outer electrode is filled with the electrolyte and the second electrode is positioned to extend within the open end outer housing. The inner electrode is sealed across the open end of the outer housing.

In FIGURE 2, an electrolytic cell counter is used to count the flexing of a beam 100. The beam 100 is rigidly supported at one end as shown by lines 102. The beam 100 may periodically receive a force such as the force shown by the arrow 104. The force 104 causes the beam to flex downward and when the force 104 is removed, the beam flexes back up. Usually the force 104 is momentary so that the beam flexes back and forth fairly rapidly. It is often desirable to know not only the level of the force which may be applied to the beam 100 but also the number of times the beam is flexed. The number of times the beam is flexed is important in determining the fatigue factor of materials such as metals. This problem, for example, has occurred fairly recently in regard to the metals used in airplanes, wherein the metal failed even though the metal was never subjected to any force greater than that for which the metal was designed. The repeated application of the force, however, caused a fatigue of the metal.

The flexing of the beam 100 may be monitored by a strain gauge element 106. This strain gauge element may be any of the currently available strain gauges which are used to produce a signal in accordance with the strain. The strain, of course, is in accordance with the flexing of the beam. The output signal from the strain gauge is as shown in FIGURE 2 at the output of the strain gauge and the output signal usually is a sine wave signal. The sine wave output signal from the strain gauge 106 is applied to a clipping amplifier 108. The clipping amplifier 108 amplifies the signal from the strain gauge to a more useful level and clips the signal off so that the output pulse signal from the clipping amplifier has an amplitude which is constant, irrespective of the output from the strain gauge 106. The output from the clipping amplifier is a portion of a sine wave which resembles a square wave.

A diode 110 is used to act as a rectifier and eliminate the negative portion of the output signal from the clipping amplifier 108. The output signal is passed through a resistor 112 and applied to an electrolytic cell 126. The electrolytic cell 126 is substantially the same as the cell 26 shown in FIGURE 1 and includes electrodes 128 and 130. The electrode 128 includes active material 132. An electrolyte 134 is disposed within the electrolytic cell. As indicated above, the electrolytic cell 126 may be of the type shown in the copending application Ser. No. 519,634.

As the beam 100 is flexed, the strain gauge 106 produces the sine wave signal which is applied to the clipping amplifier 108. The output from the clipping amplifier, as rectified by the diode 110, has an amplitude which is constant, irrespective of the value of the force 104 applied to the beam 100. The electrolytic cell 126, therefore, transfers discrete quantities of active material 132 from the electrode 128 to the electrode 130 in accordance with the number of times the beam 100 is flexed.

As an example, the electrolytic cell counter shown in FIGURE 2 may be used in a testing program to determine the number of times a metal must be flexed before it undergoes fatigue, even though the value of the force applied to the metal is less than the value necessary to destroy the metal. It is to be appreciated that the counting system of FIGURE 2 may be applied to the counting of other types of events which occur in the manner shown in FIGURE 2. It is to be appreciated that in FIGURE 1 the signal applied to the electrolytic cell is a pulse signal having a rapid change between a positive and a negative direction, whereas the signal applied to the electrolytic cell of FIGURE 2 is essentially a portion of a sine wave which resembles a square wave. However, any type of signal may be used as long as each pulse is essentially the same as the other pulses in the signal.

The electrolytic cell stores a discrete quantity of active material in accordance with the quantity of the charge provided by each pulse in the signal applied to the electrolytic cell. However, each discrete quantity will be the same for each occurrence of the particular event since all the pulses are substantially the same in each signal. The total plated material, therefore, represents a plurality of these discrete quantities and the number of occurrences may be determined by dividing the value for the individual discrete quantity into the total plated quantity of active material. It is to be appreciated that the pulse signal applied to the electrolytic cell so as to provide for a transfer of the discrete quantity may have any shape for the pulses as long as each pulse in the pulse signal is substantially identical to the other pulses produced by the particular event. For example, as shown in FIGURE 3, a different type of pulse signal is applied to the electrolytic cells to transfer the active material.

In FIGURE 3, it may be desirable to count the occurrence of a wave 200 of a particular height. For example, a post 202 may be disposed in the water in the path of the wave 200. A pair of contacts 204 are placed on the post 200. As the wave passes over the contacts 204 the wave produces a short circuit between the contacts 204 which in turn produces a storage of active material in the counter in a manner to be explained. Since the waves in a given area occur at various heights, it is desirable to count not only the occurrence of waves over a particular height, such as the wave 200, but also to count the occurrence of waves of different discrete heights so as to provide information relating to the wave pattern in a particular area. In order to accomplish this plural counting, additional pairs of contact members are provided. For example, contact members 206, 208 and 210 are positioned on the post 202 to different heights. The contact members 204 may be used to count a wave height of 4 feet, the contact members 206 may be used to count a wave height of 6 feet, the contact members 208 may be used to count a wave height of 8 feet, and the contact members 210 may be used to count a wave height of 10 feet.

A source of D-C power, such as a battery 212, is connected to one contact member of each set of contact members. The other contact member of each set of contact members is coupled to resistors 216, 218, 220 and 222. The source of D-C power 214 is also connected to the resistors 216 through 222. It can be seen that when a wave completes the circuit between any of the sets of contact members, a voltage is developed across the appropriate one of the resistors 216–222. As an example, and as shown in FIGURE 3, when the wave 200 passes over the contact members 204, thereby closing the connection between this set of contact members, the source of D-C power 214 is coupled across the resistor 216 so that the voltage provided by the source of D-C power 214 appears across the resistor 216. This is true for any of the sets of contact members 204–210 and it is to be appreciated that as the wave heights increase, more sets of contact members are closed at the same time.

The counting circuit of FIGURE 3 also includes a plurality of series resistors 224, 226, 228 and 230 and a plurality of parallel diodes 232, 234, 236 and 238. In addition, the circuit of FIGURE 3 includes series charging capacitors 240, 242, 244 and 246 and series second diodes 248, 250, 252 and 254. Finally, a plurality of electrolytic cells 256, 258, 260 and 262 are provided to store active material to count the waves. The electrolytic cells 256 through 262 may be substantially identical to the electrolytic cells 26 and 126 shown in FIGURES 1 and 2 and may include inner and outer electrodes having active and inert material in the same manner as shown with reference to the electrolytic cells 26 and 126.

Assuming, as shown in FIGURE 3, that the wave 200 closes the contacts 204 and the voltage of the D-C source 124 is provided across the resistor 216, the time during which the voltage is provided across the resistor 216 allows for the charging of the capacitor 240 with the rate of the charge determined by the resistance of the resistor 224, the diode 232, and, of course, the capacitor 240. The rate of charge is adjusted so that the minimum length for a wave still provides for a full charge of the capacitor 240. No material is plated in the electrolytic cell 256 during the charging period because no current flows through the electrolytic cell 256 during the charging of the capacitor 240. When the wave 200 completely passes by the set of contacts 204, thereby opening the circuit between the contacts 204, the capacitor 240 discharges at a rate determined by the resistance of the discharge circuit including the resistors 216 and 224, the diode 248, the capacitor 240 and the electrolytic cell 256. The discharge current flowing through the electrolytic cell 256 provides for the plating of a specific discrete quantity of active material from one electrode to the other. As indicated above, the rate of charging plus the value of the capacitor 240 are adjusted so that the capacitor 240 is always charged to its maximum, even for the minimum length of time necessary for a wave to pass by the set of contacts, so that the same charge is always applied to the electrolytic cell 256.

It can be seen that larger waves close more sets of contacts, thereby providing for the storage of discrete charges in more than one of the electrolytic cells. This charge-discharge type of storage is very effective in counting the occurrence of events, such as the occurrence of a wave or other physical phenomenon which occur in a random manner. The pattern of the heights of the waves may be determined in accordance with the amount of stored material in the various electrolytic cells. Obviously, there will be a smaller number of 10-foot waves than 4-foot waves, so that the count of the 10-foot waves is an absolute count of all waves over 10 feet. The count of the 8-foot waves includes not only the 8-foot waves but also the 10-foot waves. Therefore, the number of waves over 10 feet may be subtracted from the number of waves over 8 feet so as to provide for the number of waves over 8 feet but less than 10 feet. This subtraction may, of course, be continued for the 6-foot waves and the 4-foot waves as well, so that it is possible to provide a breakdown for the number of waves over 4 feet, over 6 feet, over 8 feet and over 10 feet. The numbers of the different height waves may be used to provide the wave pattern in a particular area. It is to be appreciated that other physical events could be counted, such as wind, pressure, temperature, etc.

It is to be appreciated that the various embodiments shown are merely illustrative of an electrolytic cell counter which may be used to count particular events. The type of signal developed may be in accordance with the particular type of event and a plurality of such

What is claimed is:

1. An electrolytic cell counter for storing discrete quantities of information in representation of the occurrence of a particular event, including
   an electrolytic cell including at least a pair of electrodes in contact with an electrolyte and with a first one of the electrodes including at least a layer of active material and with a second one of the electrodes including at least a layer of inert material and with the electrolyte providing for a transfer of the active material between the electrodes,
   first means responsive to the occurrence of the particular event for producing an output signal in accordance with the occurrence of the particular event and with the output signal having a value independent of the particular event, and
   second means coupled to the first means and the electrolytic cell and responsive to the output signal from the first means for passing only a unipolar portion of the output signal to the electrolytic cell to obtain a transfer of a discrete quantity of active material from the first electrode to the second electrode of the electrolytic cell.

2. The electrolytic cell counter of claim 1 wherein the output signal produced by the first means has alternating characteristics and wherein the second means includes rectifying means for coupling signals of single polarity to the electrolytic cell.

3. The electrolytic cell counter of claim 1 wherein the second means includes means for storing a charge in accordance with the occurrence of the particular event and for passing the charge to the electrolytic cell to obtain a transfer of the discrete quantity of active material from the first electrode to the second electrode of the electrolytic cell.

4. The electrolytic cell counter of claim 1 including a plurality of electrolytic cells, a plurality of first means, and a plurality of second means, and wherein individual ones of the plurality of first means are responsive to discrete levels of the particular event.

5. An electrolytic cell counter for storing current pulses in representation of the occurrence of a particular event, including
   an electrolytic cell including an electrolyte and at least a pair of electrodes in contact with the electrolyte and with a first one of the electrodes including at least a layer of active material and with a second one of the electrodes including at least a surface of inert material and with the electrolyte providing for a transfer of the active material from the first electrode to the second electrode,
   first means responsive to the occurrence of the particular event for producing a current pulse in accordance with the occurrence of the particular event and with the current pulse having a value independent of the particular event, and
   second means coupled to the first means and the electrolytic cell and responsive to the current pulse from the first means for coupling a unipolar portion of the current pulse to the electrolytic cell to obtain a transfer of a discrete quantity of active material from the first electrode to the second electrode.

6. The electrolytic cell counter of claim 5 wherein the current pulse is a unipolar portion of a sine wave having substantially constant energy characteristics.

7. The electrolytic cell counter of claim 5 wherein the current pulse includes a unipolar portion having a sharp transition between the positive and the negative direction and having substantially constant energy characteristics.

8. An electrolytic cell counter for counting the occurrence of a particular event and for storing information representing the count, including,
   first means responsive to the occurrence of the particular event for producing a signal in accordance with the occurrence of the particular event and with the signal having a value independent of the particular event and having alternating characteristics,
   an electrolytic cell including an electrolyte and at least a pair of electrodes in contact with the electrolyte and with a first one of the electrodes including at least a layer of active material and with a second one of the electrodes including at least a surface of inert material and with the electrolyte providing for a transfer of the active material from the first electrode to the second electrode in accordance with the passage of current through the electrolytic cell in a particular direction, and
   second means coupled to the first means and the electrolytic cell and responsive to the signal from the first means for coupling to the electrolytic cell a particular portion of the alternating current signal with a polarity corresponding to the particular direction to obtain a transfer of a discrete quantity of active material from the first electrode to the second electrode.

9. The electrolytic cell counter of claim 8 wherein the sound means includes rectifying means to couple only the particular portion of the signal to the electrolytic cell.

10. An electrolytic cell counter for storing discrete quanties of information in representation of the occurrence of a particular event, including
    an electrolytic cell including an electrolyte and at least a pair of electrodes in contact with the electrolyte and with a first one of the electrodes including at least a layer of active material and with a second one of the electrodes including at least a surface of inert material and with the electrolyte providing for a transfer of the active material from the first electrode to the second electrode,
    first means including a capacitor responsive to the occurrence of the particular event and having saturable characteristics for charging the capacitor to saturation in accordance with the occurrence of the particular event, and
    second means coupled to the first means and the electrolytic cell and responsive to the discontinuation of the particular event for discharging the capacitor through the electrolytic cell in a direction to obtain a transfer of a discrete quantity of active material from the first electrode to the second electrode.

11. The electrolytic cell counter of claim 10 wherein the first means includes a switch which is closed by the occurrence of the particular event and which opens upon the discontinuation of the particular event.

12. The electrolytic cell counter of claim 10 including a plurality of electrolytic cells corresponding to the electrolytic cell recited in claim 10, a plurality of first means corresponding to the first means recited in claim 10 and a plurality of second means corresponding to the second means in claim 10 and with individual ones of the electrolytic cells, the first means and the second means being electrically associated with one another in a manner similar to that recited in claim 10 and with individual ones of the first means in the plurality being responsive to different magnitudes in the occurrence of the particular event.

13. A cell counter for storing discrete quantities of information in representation of the occurrence of a particular event and in representation of the frequency of occurrence of different values of the particular event, including
    a plurality of electrolytic cells each including an electrolyte and at least a pair of electrodes in contact with the electrolyte and with first ones of the electrodes including at least a layer of active material and with second ones of the electrodes including at least a surface of inert material and with the electrolyte providing for a transfer of the active material from the first electrode to the second electrode, a plurality of first means each responsive to the occurrence of a different value of the particular event to produce an output signal in accordance with the occurrence of such different value of the particular event, and a plurality of second means each coupled to an individual one of the first means in the plurality and an individual one of the electrolytic cells in the plurality and responsive to the output signals from the individual one of the first means in the plurality for coupling the output signals to the individual ones of the electrolytic cells in the plurality to obtain a transfer of discrete quantities of active material from the first electrode to the second electrode in the individual one of the electrolytic cells.

14. The counter of claim 13 wherein each one of the first means in the plurality includes a switch which closes upon the occurrence of an individual value of the particular event.

15. The counter set forth in claim 14 wherein each of the second means includes a capacitor having saturable characteristics and a unidirectional member and wherein each of the second means is connected to the associated one of the first means to obtain a charging of the capacitor to the saturated value and wherein each of the second means is connected to the associated one of the electrolytic cells to obtain a discharge of the capacitor through the electrolytic cell in a direction for providing for a transfer of the active material from the first electrode to the second electrode in the electrolytic cell.

References Cited

UNITED STATES PATENTS

| | | | |
|---|---|---|---|
| 3,268,803 | 8/1966 | Alexander | 324—94 X |
| 3,315,236 | 4/1967 | Hewlett | 340—173 |
| 3,344,412 | 9/1967 | Goodale et al. | 340—173 |
| 3,363,239 | 1/1968 | Alexander | 340—173 |

BERNARD KONICK, Primary Examiner

J. F. BREIMAYER, Assistant Examiner

U.S. Cl. X.R.

320—1; 324—94; 340—244